US008547892B2

(12) United States Patent
Kazmi et al.

(10) Patent No.: US 8,547,892 B2
(45) Date of Patent: Oct. 1, 2013

(54) METHOD FOR TRANSMISSION OF MBMS CONTROL INFORMATION IN A RADIO ACCESS NETWORK

(75) Inventors: Muhammad Kazmi, Bromma (SE); Robert Baldemair, Solna (SE); Vera Vukajlovic, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 339 days.

(21) Appl. No.: 12/444,305

(22) PCT Filed: Sep. 27, 2007

(86) PCT No.: PCT/SE2007/050681
§ 371 (c)(1),
(2), (4) Date: Oct. 6, 2010

(87) PCT Pub. No.: WO2008/041928
PCT Pub. Date: Apr. 10, 2008

(65) Prior Publication Data
US 2011/0070905 A1 Mar. 24, 2011

(30) Foreign Application Priority Data

Oct. 3, 2006 (SE) ...................................... 0602078

(51) Int. Cl.
*H04H 20/71* (2008.01)
(52) U.S. Cl.
USPC ............ 370/312; 370/310; 370/328; 370/347

(58) Field of Classification Search
USPC .................................. 370/310, 312, 328, 347
See application file for complete search history.

(56) References Cited

U.S. PATENT DOCUMENTS

| 2003/0223394 | A1* | 12/2003 | Parantainen et al. ......... 370/336 |
| 2007/0054625 | A1* | 3/2007 | Beale .............................. 455/69 |
| 2009/0010196 | A1* | 1/2009 | Bui et al. ....................... 370/312 |
| 2009/0010219 | A1* | 1/2009 | Lee et al. ....................... 370/329 |
| 2009/0280832 | A1* | 11/2009 | Karaoguz et al. .......... 455/456.2 |
| 2010/0061284 | A1* | 3/2010 | Chen et al. .................... 370/311 |

OTHER PUBLICATIONS

Qualcomm Europe "Principles for E-UTRA Simulcast" 3GPP TSG-RAN WG1 LTE Ad Hoc, R1-050654, Jun. 20, 2005.*
3GPP TR 25.813 V7.0.0 (Jun. 2006). Technical Report. 3rd Generation Partnership Project; Technical Specification Group Radio Access Network; Evolved Universal Terrestrial Radio Access (E-UTRA) and Evolved Universal Terrestrial Radio Access Network (E-UTRAN) Radio interface protocol aspects (Release 7), section 11, section 9.1.1.

* cited by examiner

*Primary Examiner* — Dang Ton
*Assistant Examiner* — Robert M Morlan (57) ABSTRACT

The present invention relates to multimedia broadcast and multicast services, MBMS, in a cell wherein variable transmission bandwidth is employed. In particular the invention relates to transmission of MBMS control information relating to broadcast and multicast services. According to the method and arrangement of the invention the manner in which the transmission of MBMS control information is performed and/or the content of the MBMS control information is determined based on the amount and the portion of the cell bandwidth that is used for MBMS transmission.

20 Claims, 6 Drawing Sheets

METHOD FOR TRANSMISSION OF MBMS CONTROL INFORMATION IN A RADIO ACCESS NETWORK

FIELD OF THE INVENTION

The present invention relates to transmission of MBMS control information in a radio access network. In particular the invention relates to transmission of control information relating to broadcast and multicast services.

BACKGROUND

The interest in providing multimedia services such as TV in mobile communication systems is increasing. This is a service offered today by a plurality of operators throughout the world. The services offered today are based on a point-to-point communication, wherein each user of the service receives a specific content specified for that particular user/device. In a scenario wherein these services become popular, and a large number of users are interested in the same content at the same time, the point-to-point communication is not the most effective way of communication. Therefore, a number of broadcasting and multicasting techniques have been discussed with the aim of providing mobile TV, for example, in an efficient way in a mobile communication system. Such services are often referred to as Multimedia Broadcast and Multicast Service (MBMS) or Broadcast and Multicast Service (BCMCS).

The description of prior art and also the invention will have a starting point in the present mobile communication system referred to as UTRAN. UTRAN stands for UMTS Terrestrial Radio Access Network, and UMTS for Universal Mobile Communication System. The references to UTRAN and evolutions of UTRAN should be seen as non-limiting example. In the discussed evolutions of the present mobile communication systems, often referred to as E-UTRAN (Evolved UTRAN), the MBMS service will be offered in both mixed cells and dedicated MBMS cells. A mixed cell offers both unicast service such as speech, web browsing etc and MBMS service such as mobile television. In a mixed cell the MBMS service can be cell specific, that is, limited to a specific cell or it can be offered from multiple mixed cells. On the other hand in dedicated MBMS cell scenario, only MBMS service will be offered to a single or multiple dedicated MBMS cells in a coverage area. The availability of different services in different deployment scenarios is indicated to the user equipment, UE on MBMS specific control channels as done in 3GPP (Third Generation Partnership Program) Release 6.

In the following, various technological aspects and principles of MBMS transmission in UTRAN and E-UTRAN systems will be described.

MBMS Control Information

The 3GPP Release 6 supports following two control channels associated with MBMS transmission, see 3GPP TS 25.346, "Introduction of the Multimedia Broadcast/Multicast Service (MBMS) in the Radio Access Network (RAN); Stage 2".3GPP TS 25.331, "Radio Resource Control Protocol Specifications":

MBMS control channel (MCCH)
MBMS notification indication (MICH)

MCCH is a logical channel, which carries control information related to MBMS service, MBMS radio bearer etc. MCCH is also present in E-UTRAN, where it shall be mapped onto an appropriate transport channel depending upon the deployment scenario such as single cell or multiple cell MBMS transmission. The transport channel carrying MCCH is in turn mapped onto one or more resource blocks (physical channel resource). The MBMS service itself is sent on MBMS logical traffic channel called MBMS traffic channel (MTCH).

The MBMS notification is in principle similar to MICH in release 6, which is used to inform the UE about changes in MCCH information. Thus MICH in release 6 allows the UE to read MCCH in case there is change in the service information. This will prevent the UE from continuously reading MCCH thereby saving the UE power consumption. Currently the working assumption is that in E-UTRAN there is no separate channel to send MBMS indication. Instead, the MBMS notification is sent on the normal downlink control channel, which also contains other type of control informations. It is generally termed as L1/L2 (Layer 1/Layer 2) control channel since it carries information related to the lower layers.

The MCCH resource allocation (e.g. resource block, time instances etc) will be indicated in system information (BCH). This means that after acquiring synchronization, the UE shall first read the system information (BCH) and obtain MCCH. The MCCH will contain information pertaining to the offered MBMS services as well as the resource allocation for the MBMS notification.

MBMS Scenarios

As discussed above MBMS multi-cell transmission will be offered both in mixed cells and in MBMS dedicated cells. The two scenarios are described below:

In a mixed cell, where both unicast and MBMS services are offered, two main scenarios with respect to MBMS transmission are considered:

Single cell MBMS transmission
Multi-cell MBMS transmission

For all single cell or cell specific MBMS transmissions MCCH can be sent on the downlink shared channel (DL-SCH). The MBMS notification will be sent on L1/L2 control channel. The corresponding MBMS service (i.e. MTCH) will also be mapped onto DL-SCH. On the other hand MBMS multi-cell scenario should support single frequency network (SFN), enabling SFN combining (i.e. combining in the air). This means the same service should be sent on the same physical resource in all the multi-cells, which are SFN combined. Similarly the MBMS control channel should also be SFN combined, i.e. it must also share the same physical resources in all combined cells. Secondly all the resource blocks containing MBMS shall use the common scrambling code in all the mixed cells within the SFN area. It should be noted that the unicast and multi-cell MBMS services (i.e. which are SFN combined) can be multiplexed in time domain, in frequency domain or in combination thereof. The MBMS transmission via SFN is generally abbreviated as MBSFN.

In dedicated MBMS cell scenario only MBMS service is transmitted. This is typically only a multi-cell transmission scenario. The MBMS services are sent over the entire single frequency network (SFN) area using the same resource blocks in all the cells to facilitate SFN combining. Similarly the MBMS control channel should also be SFN combined.

In principle the multi-cell MBMS transmission in both mixed and MBMS dedicated cells is quite similar. This paves the way for similar solution for MBMS control information transmission and activation in the two scenarios.

MBMS Resource Allocation

Due to SFN combining for multi-cell MBMS transmission, the radio resources (resource blocks, sub-frames etc) are allocated in a centralized manner by a central MBMS server or MBMS gateway, which will be connected to all the base stations (or Node B) belonging to the SFN network.

UE Locations in Variable Bandwidth Scenario

In current systems such as UTRAN the UE reception bandwidth is the same as the cell transmission bandwidth. However in E-UTRAN, and other evolutions of the current systems, the system may employ variable bandwidth, which means for example 10 MHz in some cells and 20 MHz in another set of cells even within the same coverage area. Furthermore, the UE minimum bandwidth can be smaller than the network bandwidth. One example is that a 20 MHz UE is operating in a system with a 40 MHz cell transmission bandwidth. The MBMS control channel transmission should be such that a UE with smaller bandwidth than the cell bandwidth (e.g. 20 MHz UE operating in 40 MHz cell bandwidth) should be able to receive the MBMS control information within its reception bandwidth.

Figure 1:
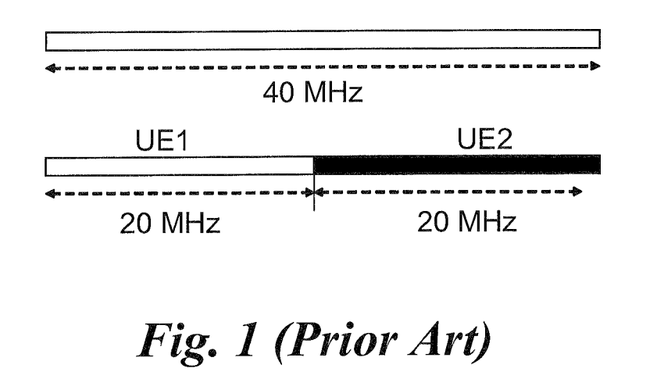
FIG. 1 illustrates schematically example locations of 20 MHz UE in 40 MHz cell bandwidth.

In order to limit the system and UE complexity a 20 MHz UE operating within 40 MHz cell bandwidth, shall be placed at two or three limited positions. Because this will require UE to tune its receiver only to few specific positions in frequency domain within a cell. FIG. 1 shows an example of a 20 MHz UE with two different positions in the frequency domain: lower (left) 20 MHz or upper 20 MHz (right).

SUMMARY OF THE INVENTION

In the current solutions MBMS control information is sent in the center of the transmission bandwidth. This solution is feasible if the bandwidths of all the UE and the cells are the same. However in some scenarios, where UE bandwidth is smaller than the network bandwidth the UE will be either placed in the lower or upper frequency half and thus cannot read the MBMS control information centered in the middle of the cell bandwidth, e.g. 40 MHz. This implies that in such a scenario, the UE will have to retune its receiver all the time to listen to the MBMS control information.

Secondly this situation also leads to less flexibility in terms of resource allocation from the network perspective. This is because the MBMS control channels could be sent on any available physical resources. It is important that the UE is aware of the resource allocation, which is indicated in the system information.

The MBMS control channel transmission to account for a scenario where UE bandwidth is smaller than the network bandwidth and where UE has limited positions in frequency domain, has not yet been addressed.

The problem with the currently known technique is thus that when the UE minimum bandwidth is smaller that the actual cell transmission bandwidth, the UE may not be able to read MBMS control information without having to retune its receiver. It is therefore an object of the present invention to solve this problem.

The claimed invention relates to a method for transmission of MBMS control information. More specifically, the invention relates to a method for transmission of MBMS control information in a radio access network comprising radio base stations and an MBMS server or an MBMS gateway in a cellular radio communication network where variable transmission bandwidth is employed and where the maximum cell transmission bandwidth is larger than the minimum user equipment bandwidth. The method is characterized by dynamically activating the transmission of MBMS control information in relation to the amount and/or portion of the cell bandwidth that is used for MBMS transmission. Dynamically activating refers to the manner how the MBMS control information is transmitted and/or modification of its content.

According to the invention, it is ensured that a UE with a smaller reception bandwidth than the transmission bandwidth of the cell in which it operates is able to receive MBMS control information within its own reception bandwidth. The dynamic activation of the MBMS control information in that portion of the cell where the corresponding MBMS services are transmitted also reduces signaling overheads. Furthermore, by having cell portion specific MBMS control information, the UE is required to read MCCH only when there is modification of services in its own portion. This saves UE battery life The invention further relates to a radio network node comprising means for performing the method described in the foregoing.

According to the invention, unicast, single cell MBMS and multi-cell MBMS services can be offered in the same cell. Services can be multiplexed in time domain or in frequency domain or combinations thereof. Alternatively, only multi-cell MBMS services are offered in a cell.

According to one embodiment of the invention, the frequency portion refers to the size of UE minimum bandwidth.

The MBMS control information can comprise MBMS control channel (MCCH) and MBMS notification.

According to a specific embodiment of the invention, the MBMS control information is sent only in the frequency portion where MBMS services are offered. The MBMS control information sent in different frequency portions, where MBMS services are offered, can be specific to that portion. The MBMS control channel preferably contains the information of the services offered in its own frequency portion and the identifiers of the services offered in the other portions of the cell bandwidth. The MBMS notification preferably indicates the modification of MBMS control channel specific to its portion of the cell bandwidth.

Alternatively, the same MBMS control information is sent in all the possible frequency portions where MBMS services are offered.

According to a specific embodiment of the invention, the MBMS control information in each frequency portion is staggered in time such that it is transmitted over more than one MCCH modification period.

Alternatively, the MBMS control information is staggered in time such that it is transmitted for only one frequency portion during any time instance.

The invention further relates to a method in a user equipment unit in a cellular radio communication network, said user equipment is operating with a bandwidth that is smaller than the cell transmission bandwidth, for MBMS transmission in a variable bandwidth scenario. The method is characterized by the steps of reading the MBMS control information sent in the frequency portion where the user equipment is currently tuned for receiving MBMS service;

determining the MBMS services or identities of MBMS services offered in the frequency portions where the user equipment is not currently tuned;

reconfigurating or retuning its frequency to any other frequency portion in order to receive the corresponding MBMS control information and MBMS service.

The invention further relates to a user equipment unit capable of operating in a cellular radio communication network with a bandwidth that is smaller than the cell transmission bandwidth. The user equipment comprises means for performing the method described in the foregoing.

Thanks to the method and the arrangement according to the invention user equipment with lower bandwidth capacity can be efficiently handled and function properly in cells with a larger and varying bandwidth.

One advantage afforded by the present invention is that the amount of signaling can be reduced, saving both system resources and increase battery life in user equipment.

A further advantage is that the user equipment does not have to retune as often as in prior methods.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

Preferred embodiments of the invention will now be described with reference to the accompanying drawings, wherein.

DETAILED DESCRIPTION

In the following, the invention will be described in more detail with reference to the drawings.

Figure 2:
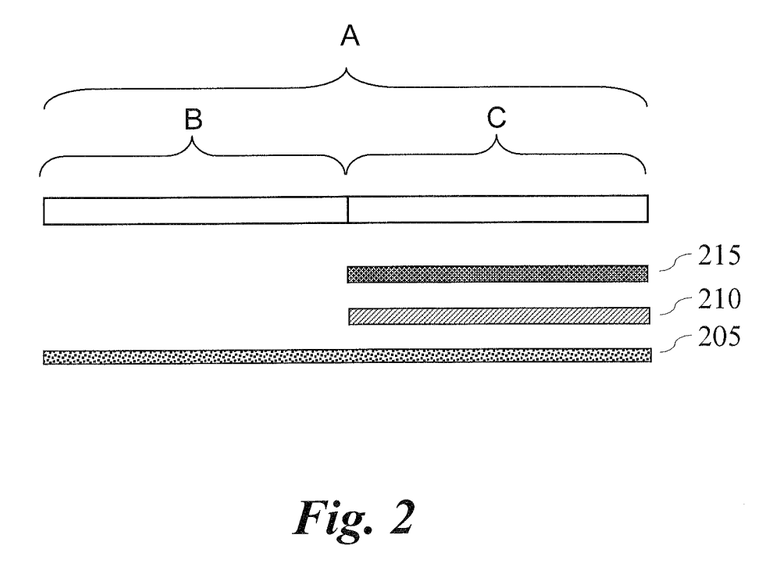
FIG. 2 illustrates schematically the full bandwidth and minimum bandwidth portions according to the invention.

A scenario wherein the method and arrangements according to the invention can be implemented is schematically illustrated in FIG. 2. A mobile communication system utilizes a radio access network for the communication with UEs. Services like multimedia broadcast and multicast are offered in the network in the manner described in the background section. In a cell of the access network, transmission of a certain bandwidth, A, can be utilized. The bandwidth A can be divided into portions, two or more, bandwidth portion B and C, representing the bandwidth capabilities of at least some UEs potentially operating in the cell. The sizes and relation of the bandwidth portions are preferably standardized. Typically and preferably the bandwidth portions are of equal size. In the following the method and arrangements will be exemplified with two bandwidth or frequency portions of equal size, the portions referred to as minimum bandwidth portions. UEs operating in the cell may have the capacity of the full bandwidth A, UE 205, or a minimum bandwidth portion, UEs 210 and 215. The MBMS transmission may occupy the full bandwidth A, or a part of the bandwidth, not necessarily bandwidth portion B or C, but for example bandwidth portion B and a part of bandwidth portion C. The MBMS transmission comprises of two parts, the MBMS service providing the payload, also referred to as MBMS traffic channel, MTCH, and MBMS control information providing the involved radio nodes with the information needed to receive the MBMS service.

Figure 3A:
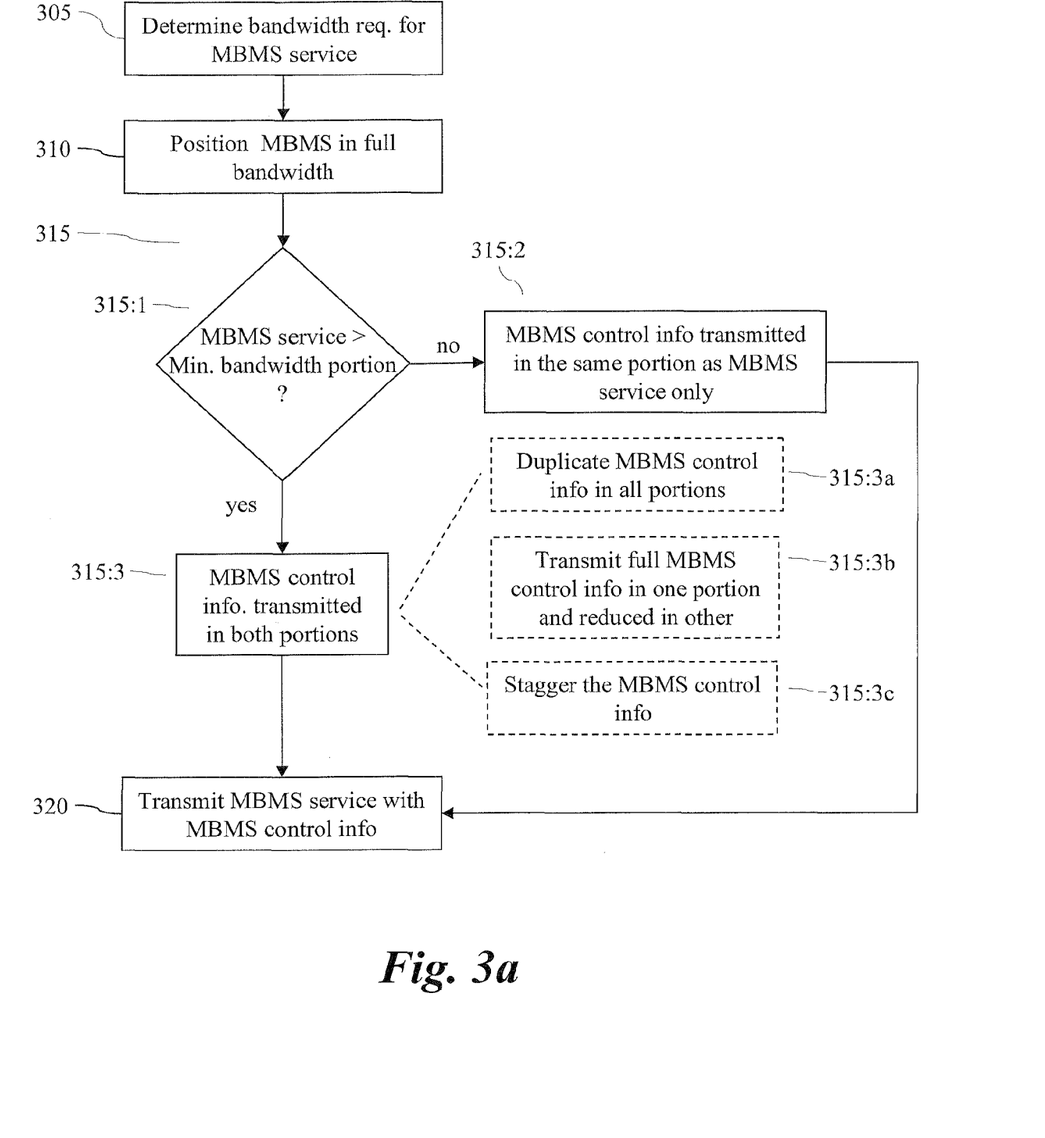
FIG. 3 is a flowchart over the method according to the invention.

According to the method of the invention the transmission of the MBMS control information is dynamically activated in relation to the amount and/or part of the cell bandwidth that is used for MBMS transmission. The method of dynamically activating MBMS control information is performed by a radio network node. The method is illustrated in the flowchart of FIG. 3a, and comprises the steps of:

305: Determining the bandwidth requirement for the MBMS transmission. The bandwidth required for the MBMS transmission may be smaller or larger than a minimum bandwidth portion, B or C, corresponding to the bandwidth capability of some UEs.

310: Positioning the MBMS transmission in the available full bandwidth, A. Dependent on the bandwidth requirement determined in a previous step the MBMS transmission will occupy less than a minimum bandwidth portion, a minimum bandwidth portion or more than one minimum bandwidth portion of the full bandwidth.

315: Dynamically activate the MBMS control information based on the in previous steps determined bandwidth requirement and position of MBMS transmission, the dynamical activation comprises at least one of the following: selecting in which minimum bandwidth portions the control information should be sent, the repetition period of MBMS control information, and adapting the content of the MBMS information. The dynamical activation may comprise the substeps:

315:1 Determine if more or less than one minimum bandwidth portion is used for the MBMS service.

315:2 If one minimum bandwidth portion or less is used for the MBMS service the MBMS control information is sent in, and only in, the minimum bandwidth portion used for the MBMS service.

315:3 If more than one minimum bandwidth portion is used for the MBMS service MBMS control information is sent in both the minimum bandwidth portions.

According to one embodiment, 315:3a, the MBMS control information is duplicated in the minimum bandwidth portions. According to another embodiment, 315:3b, full MBMS control information is provided in the minimum bandwidth portion carrying the greater part of the MBMS transmission and reduced MBMS control information is provided in the other minimum bandwidth portion. The reduced MBMS control information comprises information about therein the full bandwidth the full MBMS information is positioned, so that the UEs may find the full MBMS information.

According to yet another embodiment, 315:3c, the transmission of MBMS control information is staggered, i.e. the MBMS control information is transmitted with a longer repetition period than the transmission of the MTCH i.e. not transmitted as often as the MBMS content.

320: MBMS transmission using the dynamically activated MBMS control information as determined in previous steps. The transmission phase may comprise a continuous monitoring of the conditions regarding involved UEs in order to continuously optimize the MBMS transmission, which represents one embodiment of the invention. In this embodiment steps 303-315 are continuously repeated, which in the flowchart of FIG. 3 is illustrated with a dashed line.

The MBMS control information may be divided into several parts. As described in the background section the MBMS control information in E-UTRAN comprise two parts, the MBMS control channel (MCCH) and the MBMS notification identification.

The operator utilizing the radio access network for its operations is generally knowledgeable of the capabilities of the UEs acting in the network, either via UE feedback or via subscriber information. The decision to use dynamically activated MBMS control information could be based on the knowledge that UEs with limited capacity are present in the network, or alternatively the decision is based only on the type of services the operator intend to offer in a certain bandwidth portion, irrespective of the capabilities of the present UEs. As the MBMS control information will be dynamically activated UEs with different capacity are handled.

The steps of the method is performed in a radio node, i.e. a node in the radio access network of the communication system, for example a node B (base station). If the functionality afforded by the dynamically activated MBMS control information, is to be coordinated over a plurality of cells, a centralized node, for example a MBMS gateway needs to be involved. According to one embodiment of the invention a MBMS gateway coordinates the dynamical avctivation of MBMS control information over a plurality of cells.

Figure 3B:
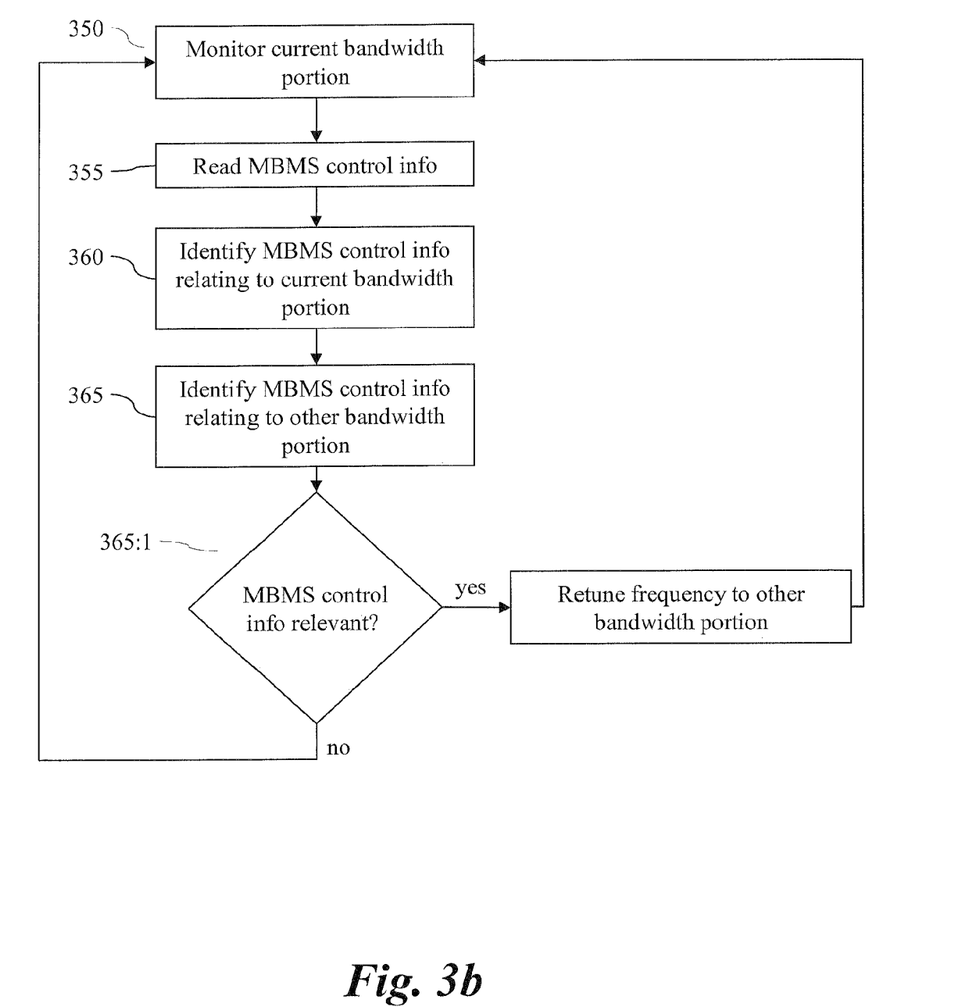

A method according to the invention, to in a UE, handle dynamically activated MBMS control information, is illustrated in the flowchart of FIG. 3b. The method is applicable to UEs utilizing a smaller minimum reception bandwidth than the full bandwidth used in a cell. The method comprises the steps of:

350: Monitor the minimum bandwidth portion to which the UE is currently tuned, for MBMS control information.

355: Read MBMS control information sent in the minimum bandwidth portion where the UE is currently tuned.

360: identify MBMS services or identities of MBMS services offered in the minimum bandwidth portion portions where the UE is currently tuned.

365: identify MBMS services or identities of MBMS services offered in the minimum bandwidth portion portions where the user UE is not currently tuned.

365:1 If the identified MBMS services or identities of MBMS services offered in the minimum bandwidth portions where the UE is not currently tuned are determined to be relevant, the UE performs frequency reconfiguration or retuning its frequency to any other frequency portion in order to receive the corresponding MBMS control information and MBMS service.

The identification in step 365 will depend on how the MBMS control information were transmitted, either as full MBMS control information or as reduced MBMS control information. In the case of full MBMS control information the UE is provided with all information required to identify if the MBMS transmission is relevant. In the case of reduced MBMS control information the UE may need to tune to the other minimum bandwidth portion to determine the relevance of the MBMS services or identities of MBMS services.

The above method is described as applicable to UEs not capable of receiving the full bandwidth. Preferably, the method should be implemented also in UEs which at the time of production are intended to receive the full bandwidth, as the "full bandwidth" may increase as the demands and systems evolve.

In the following embodiments of the invention are illustrated in the above described E-UTRAN scenario, and should be regarded as non-limiting examples. Adaptations of the invention to meet other requirements, for example other bandwidth ranges, size and number of minimum portions etc, should be obvious for the skilled person.

In a 40 MHz cell, if only one half of the cell bandwidth is used for MBMS transmission then MBMS control information is sent in the same 20 MHz cell portion, where MBMS services are sent. If more than 20 MHz is used for MBMS transmission then MBMS control information is sent in both upper and lower portions of 40 MHz cell. In the latter case the control information does not have to be duplicated in both portions of cell bandwidth. The MBMS control channel may provide more detailed information of the services in its own frequency portion and only service identifiers of the services offered in other frequency portion. The control information in the two or more portions can also be staggered in time to reduce overheads, as will be described in the following.

MBMS Control Channel Activation

A 20 MHz UE operating in 40 MHz cell transmission bandwidth should be able to receive MBMS notification and MCCH within its reception bandwidth without re-tuning its receiver. As stated before, UE shall be placed at limited positions within 40 MHz. The control channels do not have to be duplicated. The MBMS notification and MCCH can be placed any where within the 20 MHz, i.e. not necessarily in center of 20 MHz. The MBMS control information is transmitted in different ways depending upon cell bandwidth portion used for multi-cell MBMS transmission or for cell specific MBMS transmission as described in the following scenarios. The activation of MBMS control channels depending upon the amount of cell bandwidth use shall be decided by the MBMS central server and shall be indicated to the radio base stations, where actual transmission takes place.

These scenarios are valid for cell specific or multi-cell MBMS transmission in mixed cells as well as for dedicated MBMS cells.

Figure 4A:
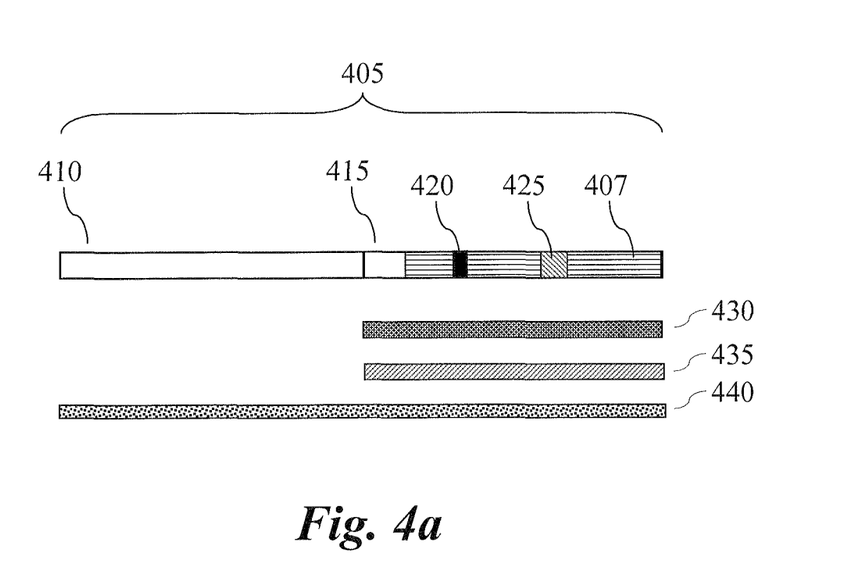
FIG. 4a illustrates MBMS control channel activation in a case where up to 20 MHz bandwidth is used, and 4b illustrates MBMS control channel activation in a case where more than 20 MHz bandwidth is used.
Figure 4B:
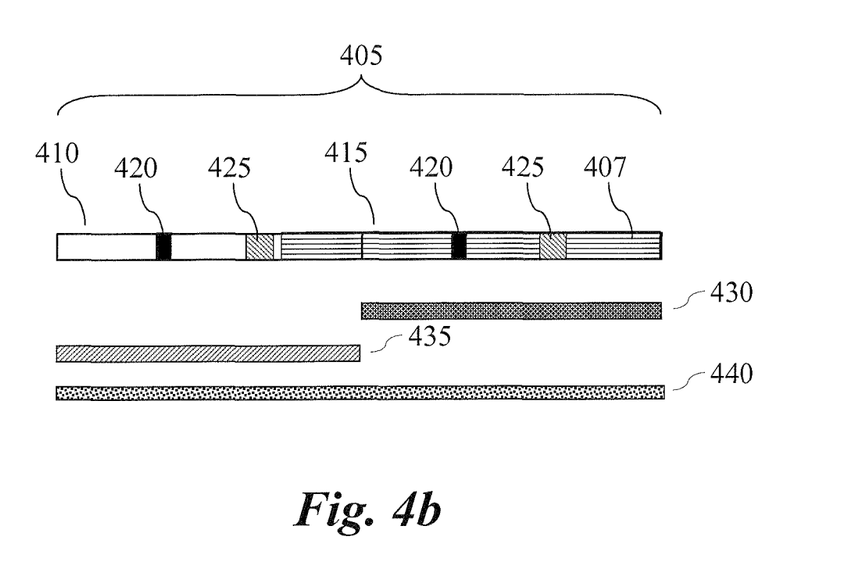

Up to One Half of 40 MHz Cell Bandwidth Usage:

In case network is offering limited number of services at a given time, it's likely that only up to 20 MHz of 40 MHz cell is used. Thus, if only one half of the 40 MHz cell bandwidth is used for MBMS transmission, then it is sufficient to transmit MBMS notification and MCCH in the same 20 MHz portion containing MTCH. This is schematically illustrated in FIG. 4a, wherein the full bandwidth 405 is divided in to equal portions, the lower portion 410 and the upper portion 415, wherein the latter is used for the MTCH 407. MCCH 420 and MBMS notification 425 is placed in the portion carrying MTCH, i.e. portion 415. UEs with a capability of using only one portion of the full bandwidth, here illustrated with UE1 430 and UE2 435 are placed at the portion containing MTCH. An UE with full bandwidth capability, here illustrated with UE 440, is not affected by the positioning of the MBSM control information More than Half of 40 MHz Cell Bandwidth Usage:

A case when MBMS transmission requires more than 20 MHz, is schematically illustrated in FIG. 4b. In this scenario MBMS notification 425 and MCCH 420 should be turned on in both upper 415 and lower portions 410 of 40 MHz cell bandwidth, in order to accommodate for UEs with limited bandwidth capabilities, 430, 435 camping on different portions, the upper portion 415 and the lower portion 410, respectively.

Figure 5:
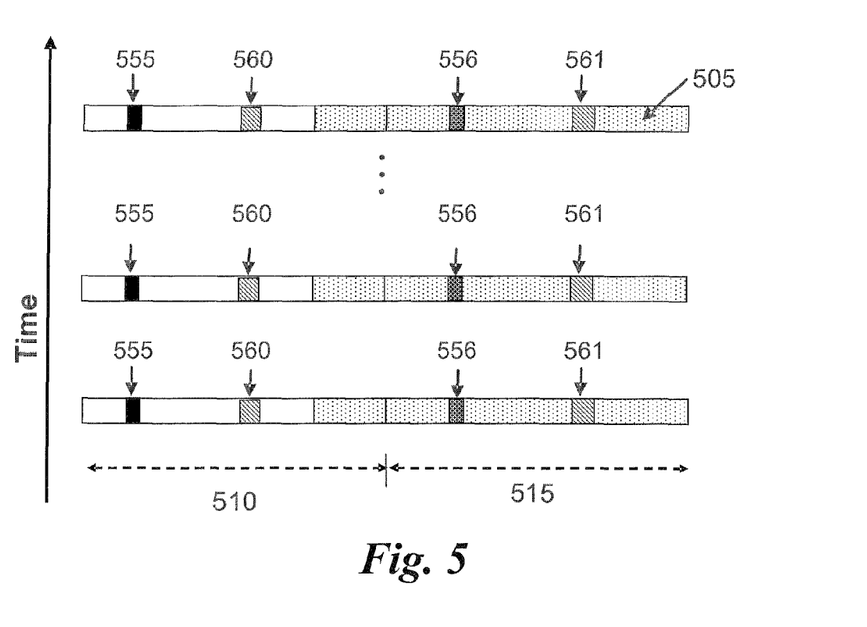
FIG. 5 illustrates schematically frequency portion specific and MBMS control information staggered in time in a case comprising partial MCCH information per repetition period, according to one embodiment of the invention.

There are number of ways MBMS control information is transmitted in the two portions of the cell bandwidth:
  Frequency portion specific MBMS control or non-identical control information
  Identical MBMS control information Frequency Portion Specific MBMS Control Information:

In one embodiment of the invention the MBMS notification and MCCH are not identical in each 20 MHz portions of the cell transmission bandwidth. The MBMS notification should indicate changes in MCCH belonging to its own 20 MHz portion of the cell. Similarly MCCH can contain the detailed service information offered in its own portion of the bandwidth and in addition the service identifiers of all the services offered in the other portion of the bandwidth. MCCH signaling overheads can further be reduced by staggering the MBMS control information in time. This means that MBMS control information is sent over more than one MCCH repetition period. The MCCH transmission with staggering contents is shown in FIG. 5. The MCCH repetition period is the interval between two successive MCCH transmissions. The MTCH 505 of the MBMS service requires more than one minimum bandwidth portion, in the figure illustrated by that the MTCH occupies all of the upper bandwidth portion 515 and a portion of the lower bandwidth portion 510. The MBMS control information, i.e. MBMS notification 555 and MCCH 560 relating to the lower portion 510 is transmitted in that portion only. The MBMS notification 556 and MCCH 561 relating to the upper portion 515 is transmitted in that portion only. However, the MBMS control information transmitted in one bandwidth portion may comprise an identifier for MBMS control information in the other bandwidth portion.

Figure 6:
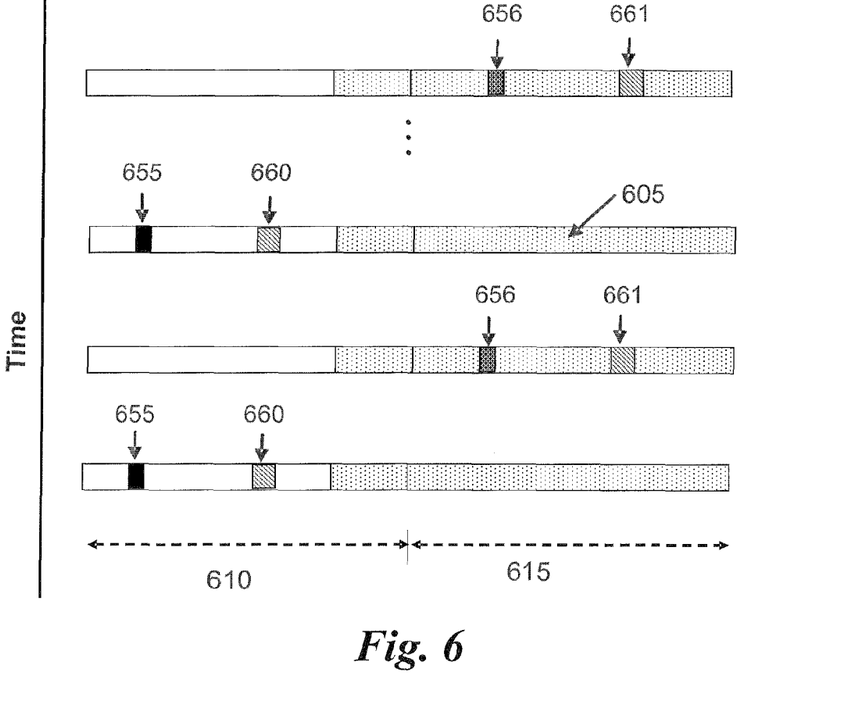
FIG. 6 illustrates schematically frequency portion specific and MBMS control information staggered in time in a case comprising full MCCH information per repetition period, according to one embodiment of the invention.

Another possibility to stagger MBMS control information is illustrated in FIG. 6. The MTCH 605 of the MBMS service requires also in this case more than one minimum bandwidth portion, in the figure illustrated by that the MTCH occupies all of the upper bandwidth portion 615 and a portion of the lower bandwidth portion 610. At a first time instance (1) the MBMS control information, i.e. MBMS notification 655 and MCCH 660 for the lower portion 610 is transmitted. At that time instance (1) no MBMS control information regarding the upper portion 615 is transmitted. At a second time instance (2) only the MBMS control information, MBMS notification 656 and MCCH 661 relating to the upper portion 615 is transmitted. At a third time instance (3) MBMS notification 655 and MCCH 660 for the lower portion 610 is again transmitted, and so on. To generalize, the MBMS control information in all the frequency portions are not transmitted at the same time instance, instead the MBMS control information is transmitted only for one frequency portion during any time instance. At the next instant MCCH is transmitted with only second frequency portion related information.

Identical MBMS Control Information:

In another embodiment the MBMS control information can be completely duplicated in each cell portion. This includes duplication of MBMS notification and MCCH. However the obvious drawback is the control overheads. Secondly this may force the UE to read MCCH more often leading to inefficient UE battery usage. This can happen for instance if there is any change in service information sent in the cell portion other than where UE is currently receiving the MBMS service. The MBMS control can still be staggered in time. Therefore, staggering methods shown in FIGS. 5 and 6 are also valid for this embodiment.

Selection of Services Offered in other Frequency:

This embodiment is related to the UE. A 20 MHz UE will use the MBMS control information, especially MCCH in one frequency portion to acquire some basic information related to the services offered in other frequency portion. This basic information may comprise of service identifiers as discussed above. This will allow an UE to listen to services and the corresponding control channels in the other cell portion only if needed. Similarly any update of the services (e.g. addition of service identities) shall be reflected in the MCCH in each frequency portion. This will prevent the UE from doing unnecessary toggling to other frequency portion (or frequency reconfiguration).

Figure 7A:
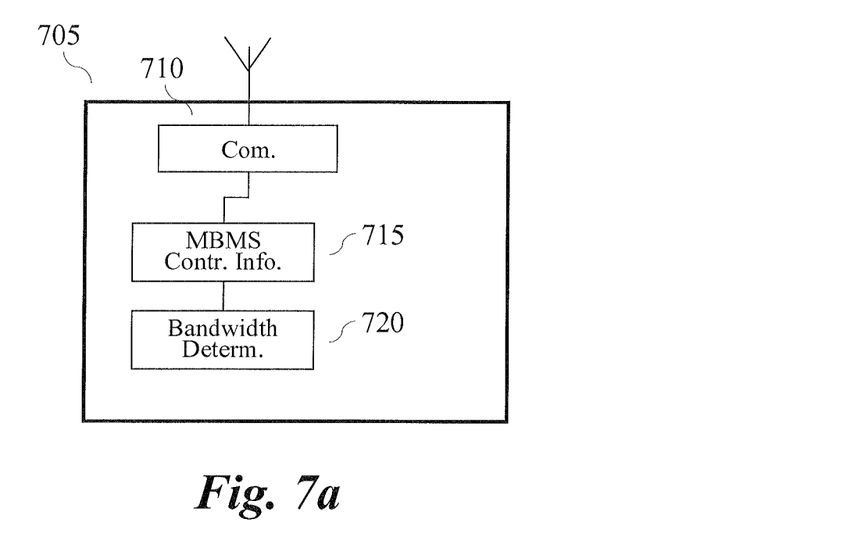
FIG. 7a is a schematic illustration of a radio network node according to particular embodiments of the present disclosure.
Figure 7B:
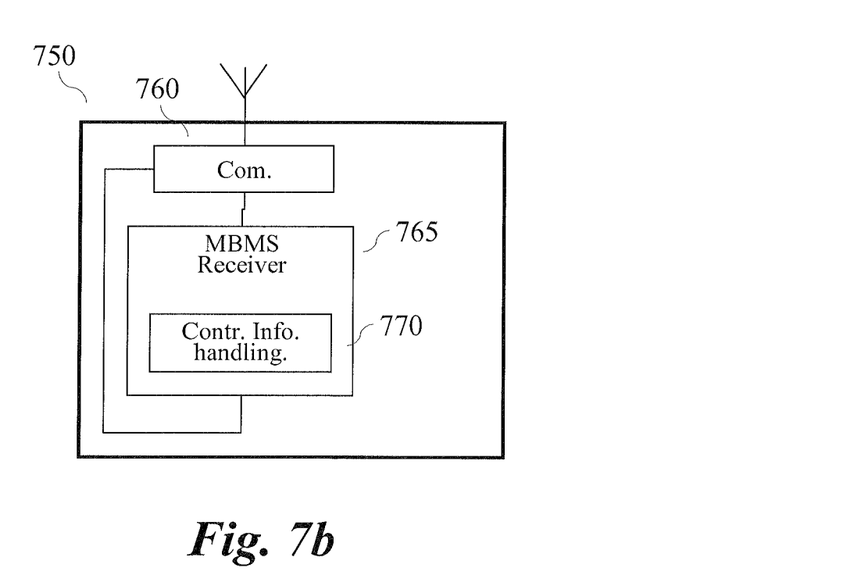
FIG. 7b is a schematic illustration of a user equipment according to particular embodiments of the present disclosure.

A radio network node 705, which may be a centralized MBMS gateway or a Node B, and a user equipment 750 according to the present invention are schematically illustrated in FIGS. 7*a-b*. The radio network node 705, and the UE 750 are provided with respective means for carrying out respective parts of the method described above. The modules and blocks according to the present invention are to be regarded as functional parts of the nodes and not necessarily as physical objects by themselves. The term "comprising" does primarily refer to a logical structure and the term "connected" should here be interpreted as links between functional parts and not necessarily physical connections. However, depending on the chosen implementation, certain modules may be realized as physically distinctive objects in a receiving or sending device. It should also be noted that the design of modern access networks offers a great deal of flexibility in there a specific function is executed. Radio network control functions, may for example be executed in a radio base station or a dedicated controller node, or even a combination of both. Hence, it should be understood that a function or module could reside in one node, but logically, for the functionality here described, belong to the radio network node 705.

The radio network node 705 comprises a radio communication module 710 adapted for communication with one or more UEs. According to the invention the radio network node 705 comprises an MBMS module adapted to provide multimedia broadcast services in the cell that the radio network node 705 serves. The MBMS module can be configured to provide mixed cell services, i.e. the radio network node 705 provides both unicast services such as speech and broadcast services, or configured to provide MBMS services only, i.e. serving a dedicated MBMS cell. The MBMS module comprises a MBMS control information module 715 adapted to handle the control information associated with MBMS. In connection with the MBMS control information module 715 is a MBMS bandwidth determining module 720, adapted to determine the bandwidth needed for the MBMS transmission and the capabilities of the UEs which are to receive the MBMS transmission. The MBMS bandwidth determining module 720 is further adapted to position the MBMS transmission in the available bandwidth and to provide the MBMS control information module 715 with the required bandwidth and position information. The MBMS control information module 715 is adapted to dynamically activate the MBMS control information based on the bandwidth and position information and may further be adapted to also alter the content of the MBMS information based on the bandwidth and position information. The MBMS control information module 715 is further adapted to perform the dynamical activation according to all the principles described in conjunction with the various embodiments of the method according to the invention. A MBMS gateway does typically not comprises any radio communication means. In the case the MBMS gateway is responsible for the MBMS control information handling, the MBMS gateway will perform the communication with the UEs via at least one node B, and the radio communication module of the node B can functionally be seen as comprised in the MBMS gateway.

The user equipment 750 according to the invention comprises a radio communication module 760 adapted for communication with a radio network node. According to the invention the radio network node 705 comprises an MBMS receiving module 765 in connection with the radio communication module 760 and adapted to process received MBMS transmission. The MBMS receiving module 765 comprises a MBMS control information handling module 770 adapted to read MBMS control information in a minimum bandwidth portion to which the UE is currently tuned to, and whereby identifying MBMS services or identities of MBMS services offered in the current minimum bandwidth portion or another portion. If relevant MBMS services or identities of MBMS services offered in another minimum bandwidth portion are identified, the MBMS control information handling module 770 is adapted to instruct the radio communication module 760 to perform frequency reconfiguration or retune its reception to another minimum bandwidth portion in order to receive the corresponding MBMS control information and MBMS service.

The method according to the present invention may be implemented, at least in parts, by means of program products or program module products comprising the software code means for performing the steps of the method. The program products are preferably executed on a plurality of entities within a network. The program is distributed and loaded from a computer usable medium, such as a USB-memory, a CD, or transmitted over the air, or downloaded from Internet, for example.

While the invention has been described in connection with what is presently considered to be the most practical and preferred embodiments, it is to be understood that the invention is not to be limited to the disclosed embodiments, on the contrary, it is intended to cover various modifications and equivalent arrangements within the appended claims.

The invention claimed is:

1. A method in a radio network node for transmission of multimedia broadcast and multicast service (MBMS) control information, in connection with a MBMS service, in a radio access network comprising a radio base station serving a cell wherein variable transmission bandwidth is employed and the cell has a defined maximum transmission bandwidth, said defined maximum transmission bandwidth comprising a full bandwidth, and a defined minimum bandwidth portion of the full bandwidth, the method comprising:
   a) dynamically activating transmission of MBMS control information based on an amount and portion of a cell bandwidth that is used for a MBMS transmission;
   b) modifying content of the MBMS control information based on the amount and the portion of the cell bandwidth that is used for the MBMS transmission; and
   the method further comprising:
   determining the bandwidth requirement for the MBMS transmission;
   positioning the MBMS transmission in an available bandwidth;
   determining if more or less than one minimum bandwidth portion is used for the MBMS service; and
   if one minimum bandwidth portion or less is used for the MBMS service, the MBMS control information is sent in, and only in, the minimum bandwidth portion used for the MBMS service, and if more than one minimum bandwidth portion is used for the MBMS service, the MBMS control information is sent in more bandwidth portions than the minimum bandwidth portion carrying a major part of the MBMS service.

2. The method according to claim 1, wherein if more than one minimum bandwidth portion is used for the MBMS service, the MBMS control information is duplicated in all the minimum bandwidth portions.

3. The method according to claim 1, wherein if more than one minimum bandwidth portion is used for the MBMS service, full MBMS control information is provided in the minimum bandwidth portion carrying the major part of the MBMS service and reduced MBMS control information is provided in other minimum bandwidth portion or portions, and the reduced MBMS control information comprises information about where the full MBMS control information is positioned in the full bandwidth.

4. The method according to claim 3, wherein the full and reduced MBMS control information are transmitted alternately in respective bandwidth portions at different times.

5. The method according to claim 1, wherein if more than one minimum bandwidth portion is used for the MBMS service, first MBMS control information is provided in a first minimum bandwidth portion and comprises full MBMS control information for that bandwidth portion, and second MBMS control information is provided in a second minimum bandwidth portion and comprises full MBMS control information for that bandwidth portion, and wherein the first MBMS control information comprises an indication of the second MBMS control information and the second MBMS control information comprises an indication of the first MBMS control information.

6. The method according to claim 5, wherein the first and second MBMS control information are transmitted alternately in respective bandwidth portions at different times.

7. The method according to claim 1, wherein if more than one minimum bandwidth portion is used for the MBMS service, the same MBMS control information is transmitted in all bandwidth portions but alternately in different bandwidth portions at different times.

8. The method according to claim 1, wherein unicast, single cell MBMS and multi-cell MBMS services are offered in the cell.

9. The method according to claim 8, wherein the unicast, single cell and multi-cell MBMS services are multiplexed in time domain or in frequency domain or combinations thereof.

10. The method according to claim 1, wherein only multi-cell MBMS services are offered in the cell.

11. The method according to claim 1, wherein the minimum bandwidth portion represents a minimum bandwidth requirement of user equipment supported in the cell.

12. The method according to claim 1, wherein the MBMS control information comprises a MBMS control channel or a MBMS notification or combination thereof.

13. The method according to claim 12, wherein the MBMS notification indicates a modification of the MBMS control channel specific to a corresponding portion of the cell bandwidth.

14. A radio network node adapted for performing multimedia broadcast and multicast service (MBMS) in a cell wherein variable transmission bandwidth is employed and the cell has a defined maximum transmission bandwidth, hereinafter referred to as the full bandwidth, and a defined minimum bandwidth portion of the full bandwidth, the multimedia broadcast and multicast service comprising transmission of MBMS control information, the radio network node comprising:
   a radio communication module adapted for communication with user equipment;
   an MBMS module for providing a MBMS service in the cell that the radio network node serves;
   a MBMS control information module for handling the MSMS control information associated with the MBMS service and dynamically activating the MBMS control information based on bandwidth and position information of a MBMS transmission;
   a MBMS bandwidth determining module in connection with the MBMS control information module, for determining a bandwidth needed for the MBMS transmission and the capabilities of the user equipment which are to receive the MBMS transmission and for positioning the MBMS transmission in an available bandwidth and for providing the MBMS control information module with a required bandwidth and position information; and the MBMS control information module is further for determining if more or less than one minimum bandwidth portion is used for the MBMS service, and if one minimum bandwidth portion or less is used for the MBMS service, arranging the MBMS control information to be sent in the minimum bandwidth portion used for the MBMS service, and if more than one minimum bandwidth portion is used for the MBMS service, arranging the MBMS control information to be sent in both minimum bandwidth portions.

15. The radio network node according to claim 14, wherein the MBMS control information module is adapted to arrange the MBMS control information to be duplicated in the minimum bandwidth portions.

16. The radio network node according to claim 14, wherein the MBMS control information module is adapted to provide full MBMS control information in the minimum bandwidth portion carrying a major part of the MBMS service and reduced MBMS control information in other minimum bandwidth portion or portions, and wherein the reduced MBMS control information comprises information about where the full MBMS control information is positioned in the full bandwidth.

17. The radio network node according to claim 14, wherein the MBMS control information module is adapted to provide first MBMS control information to be provided in a first minimum bandwidth portion and comprising full MBMS control information for that bandwidth portion, and second MBMS control information in a second minimum bandwidth portion and comprising full MBMS control information for that bandwidth portion, and wherein the first MBMS control information comprises an indication of the second MBMS control information and the second MBMS control information comprises an indication of the first MBMS control information.

18. The radio network node according to claim 17, wherein MBMS module is adapted to transmit the first and second MBMS control information in respective bandwidth portions at different times.

19. The radio network node according to claim 14, wherein the MBMS module is adapted to provide both unicast, single cell MBMS and multi-cell MBMS services.

20. The radio network node according to claim 19, wherein the MBMS module is adapted to multiplex the unicast, single cell and multi-cell MBMS services in time domain or in frequency domain or combinations thereof.

* * * * *

UNITED STATES PATENT AND TRADEMARK OFFICE
CERTIFICATE OF CORRECTION

| | | |
|---|---|---|
| PATENT NO. | : 8,547,892 B2 | Page 1 of 1 |
| APPLICATION NO. | : 12/444305 | |
| DATED | : October 1, 2013 | |
| INVENTOR(S) | : Kazmi et al. | |

It is certified that error appears in the above-identified patent and that said Letters Patent is hereby corrected as shown below:

In the Specifications

In Column 3, Line 47, delete "smaller that" and insert -- smaller than --, therefor.

In Column 4, Line 49, delete "steps of" and insert -- steps of: --, therefor.

In Column 5, Line 30, delete "invention; and" and insert -- invention; --, therefor.

In Column 5, Line 34, delete "invention." and insert -- invention; --, therefor.

In Column 7, Line 22, delete "avctivation" and insert -- activation --, therefor.

In the Claims

In Column 12, Line 59, in Claim 14, delete "MSMS" and insert -- MBMS --, therefor.

Signed and Sealed this
Twenty-fifth Day of March, 2014

Michelle K. Lee
*Deputy Director of the United States Patent and Trademark Office*